US007557817B2

(12) United States Patent
Soroushi et al.

(10) Patent No.: US 7,557,817 B2
(45) Date of Patent: Jul. 7, 2009

(54) METHOD AND APPARATUS FOR OVERLAYING REDUCED COLOR RESOLUTION IMAGES

(75) Inventors: Atousa Soroushi, North Vancouver (CA); Jerzy Wieslaw Swic, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 523 days.

(21) Appl. No.: 11/420,571

(22) Filed: May 26, 2006

(65) Prior Publication Data

US 2007/0046687 A1 Mar. 1, 2007

Related U.S. Application Data

(60) Provisional application No. 60/710,764, filed on Aug. 23, 2005.

(51) Int. Cl.
*G09G 5/00* (2006.01)
*G09G 5/02* (2006.01)

(52) U.S. Cl. ....................... 345/634; 345/589; 345/592; 345/629

(58) Field of Classification Search ................. 345/589, 345/629, 634
See application file for complete search history.

(56) References Cited

U.S. PATENT DOCUMENTS 4,758,892 A * 7/1988 Bloomfield ................. 348/585
4,884,040 A * 11/1989 Fling .......................... 331/1 A
5,003,491 A * 3/1991 Heckt ......................... 345/639
5,027,205 A * 6/1991 Avis et al. ................... 348/441
5,027,209 A * 6/1991 Nishimura et al. .......... 348/616
5,185,655 A * 2/1993 Wakeland ................ 348/392.1
5,450,367 A * 9/1995 Butler et al. ........... 365/230.05
5,488,390 A * 1/1996 Reinert et al. ............... 715/856
5,546,518 A * 8/1996 Blossom et al. ............. 345/473
5,568,167 A * 10/1996 Galbi et al. ................. 348/589
5,592,237 A * 1/1997 Greenway et al. ........... 348/716
5,640,496 A * 6/1997 Hardy et al. ................ 345/421
5,784,631 A * 7/1998 Wise .......................... 382/246
5,805,914 A * 9/1998 Wise et al. .................. 382/232
5,872,902 A * 2/1999 Kuchkuda et al. ........... 345/615
5,883,627 A * 3/1999 Pleyer ........................ 345/629
5,920,322 A * 7/1999 Ulichney .................... 345/604
5,999,710 A * 12/1999 Smith et al. ................ 358/1.15
6,101,221 A * 8/2000 Varanasi et al. ............. 375/240
6,122,316 A * 9/2000 Varanasi et al. ........ 375/240.12
6,154,576 A * 11/2000 Anderson et al. ........... 382/269

(Continued)

*Primary Examiner*—Kee M Tung
*Assistant Examiner*—Roberta Prendergast

(57) ABSTRACT

In one embodiment, an image is created by combining an overlay image with a main image. Each pixel of the main and overlay images is defined by a luma component and at least one color component. Each luma component takes a value within a luma range, the lowest and highest values in the luma range being, respectively, a minimum and maximum value. For each pixel in the overlay image, it is determined that the pixel is: an opaque pixel, a transparent pixel, or an intermediate pixel. Each pixel of the main image that is in a location that corresponds to the location of an opaque pixel is replaced with the corresponding opaque pixel. In one embodiment, each pixel of the main image that is in a location that corresponds to the location of a transparent pixel is retained. Further, the luma component of each pixel of the main image that is in a location that corresponds to the location of an intermediate pixel is, in one embodiment, replaced with a luma value that is equivalent to the two's complement of the luma value of the corresponding intermediate pixel.

17 Claims, 11 Drawing Sheets

U.S. PATENT DOCUMENTS 6,177,945 B1 * 1/2001 Pleyer ........................ 345/473
6,236,681 B1 * 5/2001 Varanasi et al. ........ 375/240.15
6,262,746 B1 7/2001 Collins
6,310,918 B1 * 10/2001 Saha et al. ............. 375/240.16
6,377,269 B1 * 4/2002 Kay et al. ................... 345/589
6,396,473 B1 * 5/2002 Callahan et al. ............. 345/530
6,466,206 B1 * 10/2002 Deering ...................... 345/419
6,466,220 B1 * 10/2002 Cesana et al. ............... 345/537
6,504,871 B1 * 1/2003 Varanasi et al. .......... 375/240.2
6,542,162 B1 * 4/2003 Hrusecky et al. ............ 345/629
6,573,945 B1 * 6/2003 Wu et al. .................... 348/584
6,711,291 B1 * 3/2004 Stubler et al. ............... 382/195
6,771,274 B2 * 8/2004 Dawson ...................... 345/592
6,950,130 B1 9/2005 Qian
7,145,573 B2 * 12/2006 Gottardo et al. ............. 345/589
7,414,632 B1 * 8/2008 Piazza et al. ................ 345/592
7,417,647 B2 * 8/2008 Jeffrey ....................... 345/634
2002/0066007 A1 * 5/2002 Wise et al. .................. 712/300
2002/0196370 A1 * 12/2002 Dagtas et al. ............... 348/600
2003/0158668 A1 * 8/2003 Anderson ...................... 702/5
2003/0174145 A1 * 9/2003 Lyapunov et al. ........... 345/613
2003/0184553 A1 * 10/2003 Dawson ...................... 345/581
2004/0061902 A1 * 4/2004 Tang et al. ................. 358/3.01
2004/0169664 A1 * 9/2004 Hoffman et al. ............ 345/629
2005/0013372 A1 * 1/2005 Srinivasan ............. 375/240.16
2005/0013373 A1 * 1/2005 Lin et al. ............... 375/240.18
2005/0134601 A1 * 6/2005 Gottardo et al. ............. 345/592
2005/0134608 A1 * 6/2005 Lafon ......................... 345/629
2005/0225562 A1 * 10/2005 Higgins et al. .............. 345/604
2007/0040849 A1 * 2/2007 Jeffrey ....................... 345/629

* cited by examiner

28 FRAME BUFFER PORTION

| | | | | | | |
|---|---|---|---|---|---|---|
| $P_{10,5}$ | $P_{10,6}$ | $P_{10,7}$ | $P_{10,8}$ | $P_{10,9}$ | $P_{10,10}$ | $P_{10,11}$ |
| $P_{11,5}$ | $P_{11,6}$ | $P_{11,7}$ | $P_{11,8}$ | $P_{11,9}$ | $P_{11,10}$ | $P_{11,11}$ |
| $P_{12,5}$ | $P_{12,6}$ | $P_{12,7}$ | $P_{12,8}$ | $P_{12,9}$ | $P_{12,10}$ | $P_{12,11}$ |
| $P_{13,5}$ | $P_{13,6}$ | $P_{13,7}$ | $P_{13,8}$ | $P_{13,9}$ | $P_{13,10}$ | $P_{13,11}$ |
| $P_{14,5}$ | $P_{14,6}$ | $P_{14,7}$ | $P_{14,8}$ | $P_{14,9}$ | $P_{14,10}$ | $P_{14,11}$ |
| $P_{15,5}$ | $P_{15,6}$ | $P_{15,7}$ | $P_{15,8}$ | $P_{15,9}$ | $P_{15,10}$ | $P_{15,11}$ |

*FIG. 2a*

28 FRAME BUFFER PORTION

| | | | | | | |
|---|---|---|---|---|---|---|
| $P_{10,5}$ | $P_{10,6}$ | $P_{10,7}$ | $P_{10,8}$ | $P_{10,9}$ | $P_{10,10}$ | $P_{10,11}$ |
| $P_{11,5}$ | $P_{11,6}$ | $P_{11,7}$ | $P_{11,8}$ | $P_{11,9}$ | $P_{11,10}$ | $P_{11,11}$ |
| $P_{12,5}$ | $P_{12,6}$ | $P'_{2,2}$ | $P'_{2,3}$ | $P'_{2,4}$ | $P'_{2,5}$ | $P'_{2,6}$ |
| $P_{13,5}$ | $P_{13,6}$ | $P'_{3,2}$ | $P'_{3,3}$ | $P'_{3,4}$ | $P'_{3,5}$ | $P'_{3,6}$ |
| $P_{14,5}$ | $P_{14,6}$ | $P'_{4,2}$ | $P'_{4,3}$ | $P'_{4,4}$ | $P'_{4,5}$ | $P'_{4,6}$ |
| $P_{15,5}$ | $P_{15,6}$ | $P'_{5,2}$ | $P'_{5,3}$ | $P'_{5,4}$ | $P'_{5,5}$ | $P'_{5,6}$ |

*FIG. 2b*

OVERLAY IMAGE TILE

FRAME BUFFER PORTION

MAIN IMAGE PORTION

COLUMNS
         ⟋42
ROWS    0      1      2      3

| ROWS | 0 | 1 | 2 | 3 |
|---|---|---|---|---|
| 0 | $Y_{0,0}$ | $Y_{0,1}$ | $Y_{0,2}$ | $Y_{0,3}$ |
| 1 | $Y_{1,0}$ | $Y'_{0,0}$ | $Y'_{0,1}$ | $Y_{1,3}$ |
| 2 | $Y_{2,0}$ | $Y'_{1,0}$ | $Y'_{1,1}$ | $Y_{2,3}$ |
| 3 | $Y_{3,0}$ | $Y_{3,2}$ | $Y_{3,2}$ | $Y_{3,3}$ |
| 4 |  |  |  |  |
| 5 | $U'_{0,0}$ | $V'_{0,0}$ | $U'_{0,0}$ | $V'_{0,0}$ |
| 6 | $U'_{0,0}$ | $V'_{0,0}$ | $U'_{0,0}$ | $V'_{0,0}$ |

FRAME BUFFER PORTION

COLUMNS ⟋44

| ROWS | 0 | 1 | 2 | 3 |
|---|---|---|---|---|
| 0 | $P_{0,0}$ | $P_{0,1}$ | $P_{0,2}$ | $P_{0,3}$ |
| 1 | $P_{1,0}$ | $P'_{0,0}$ | $P'_{0,1}$ | $P_{1,3}$ |
| 2 | $P_{2,0}$ | $P'_{1,0}$ | $P'_{1,1}$ | $P_{2,3}$ |
| 3 | $P_{3,0}$ | $P_{3,2}$ | $P_{3,2}$ | $P_{3,3}$ |

IMAGE PORTION

44 MEMORY

| ROWS Y | COLUMNS 0 | 1 | 2 | 3 |
|---|---|---|---|---|
| 0 | 235 | 235 | 235 | 235 |
| 1 | 235 | 235 | 235 | 235 |
| 2 | 235 | 235 | 235 | 235 |
| 3 | 016 | 016 | 016 | 016 |
| 4 | 016 | 016 | 016 | 016 |
| 5 | 016 | 016 | 016 | 016 |
| 6 | 016 | 016 | 016 | 016 |
| 7 | 016 | 016 | 016 | 016 |
| U, V 8 | 112 | 112 | 112 | 112 |
| 9 | 112 | 112 | 112 | 112 |
| 10 | 112 | 112 | 112 | 112 |
| 11 | 112 | 112 | 112 | 112 |

OVERLAY IMAGE

46 MEMORY

| Y | 0 | 1 |
|---|---|---|
| 0 | 235 | 235 |
| 1 | 126 | 126 |
| 2 | 016 | 016 |
| 3 | 016 | 016 |
| U, V 4 | 112 | 112 |
| 5 | 112 | 112 |

SCALED OVERLAY IMAGE

*FIG. 10*

OVERLAY IMAGE TILE $U'_{0,0} = 112$ $V'_{0,0} = 112$ $Y'_{0,0} = 100$ $Y'_{0,1} = 100$ $Y'_{1,0} = 100$ $Y'_{1,1} = 100$ $Y^*_{0,0} = 156$ $Y^*_{0,1} = 156$ $Y^*_{1,0} = 156$ $Y^*_{1,1} = 156$

42

COLUMNS

| ROWS | 0 | 1 | 2 | 3 |
|---|---|---|---|---|
| 0 | $Y_{0,0}$ | $Y_{0,1}$ | $Y_{0,2}$ | $Y_{0,3}$ |
| 1 | $Y_{1,0}$ | $Y^*_{0,0}$ | $Y^*_{0,1}$ | $Y_{1,3}$ |
| 2 | $Y_{2,0}$ | $Y^*_{1,0}$ | $Y^*_{1,1}$ | $Y_{2,3}$ |
| 3 | $Y_{3,0}$ | $Y_{3,2}$ | $Y_{3,2}$ | $Y_{3,3}$ |
| 4 | | | | |
| 5 | $U_{0,0}$ | $V_{0,0}$ | $U_{0,2}$ | $V_{0,2}$ |
| 6 | $U_{2,0}$ | $V_{2,0}$ | $U_{2,2}$ | $V_{2,2}$ |

FRAME BUFFER PORTION

COLUMNS

| ROWS | 0 | 1 | 2 | 3 |
|---|---|---|---|---|
| 0 | $P_{0,0}$ | $P_{0,1}$ | $P_{0,2}$ | $P_{0,3}$ |
| 1 | $P_{1,0}$ | $P^*_{0,0}$ | $P^*_{0,1}$ | $P_{1,3}$ |
| 2 | $P_{2,0}$ | $P^*_{1,0}$ | $P^*_{1,1}$ | $P_{2,3}$ |
| 3 | $P_{3,0}$ | $P_{3,2}$ | $P_{3,2}$ | $P_{3,3}$ |

IMAGE PORTION

*FIG. 14*

METHOD AND APPARATUS FOR OVERLAYING REDUCED COLOR RESOLUTION IMAGES

CROSS-REFERENCE TO RELATED APPLICATIONS

This application claims priority from U.S. Provisional Patent Application No. 60/710,764, filed Aug. 23, 2005, entitled "Method to Implement Transparency for Text Overlay in YUV 4:2:0 Format," which is hereby incorporated by reference in its entirety.

BACKGROUND

The invention relates generally to methods and apparatus for creating an image that is a combination of a main image and an overlay image. In particular, the invention relates to main and overlay images that have had their color resolution reduced. In one embodiment, image is created in a manner that reduces the appearance of artifacts that can result when reduced color resolution images are combined.

In computer systems, overlaying a portion of a main image with one or more smaller images is often desired. The overlay image is frequently text, numbers, or symbols, but may also commonly include icons and graphical images. For example, one may want to overly a photo (a "main" image) with numbers (an "overlay" image) showing the time and date. In a digital image, a main image can be overlaid with an overlay image by replacing pixels of the main image with pixels of the overlay image in the desired region of the main image.

Reducing the color resolution of image data is also often desired in display systems. The human eye is more sensitive to brightness than to color so it is possible to reduce color resolution without much visual impact. Compared to the full-resolution version, a reduced-resolution image requires less memory and memory bandwidth. Reducing color resolution is especially desirable in systems where minimizing memory requirements, power consumption, and cost are important, such as in mobile devices that rely primarily on a battery for power. Examples of such devices include mobile telephones, personal digital assistants, digital cameras, and digital music players.

In display systems, the two techniques may be employed simultaneously: the color resolutions of the main and overlay images are reduced, and the main image is then overlaid with the overlay image. Using the two techniques at the same time, however, can cause artifacts. In particular, one artifact that can result is a gray or off-color fringe that appears around the periphery of the overlay image.

Accordingly, methods and apparatus for creating an image that is a combination of reduced color-resolution main and overlay images in a manner that reduces the appearance of artifacts that can result when the images are combined would be useful and desirable.

SUMMARY

The invention is directed to a method that comprises, in one embodiment, determining, for a pixel in a first image, that the pixel is: (a) an opaque pixel; (b) a transparent pixel; or (c) an intermediate pixel. A pixel is considered an opaque pixel when the luma value of the pixel is within an opaque range that is greater than or equal to a minimum value and lower than a first predetermined value. A pixel is considered a transparent pixel when the luma value of the pixel is within a transparent range that is less than or equal to a maximum value and greater than a second predetermined value. A pixel is considered an intermediate pixel when the luma value of the pixel is within an intermediate range that is greater than the first predetermined value and less than the second predetermined value. In addition, the first image is one of: (a) an overlay image; and (b) a main image. Each pixel of the main and overlay images is defined by a luma component and at least one color component. Each luma component takes a value within a luma range, the lowest and highest values in the luma range being, respectively, a minimum value and a maximum value. Further, the method, in one embodiment, includes replacing each pixel of a second image that is in a location that corresponds to the location of an opaque pixel in the first image. The pixel of the second image is replaced with the corresponding opaque pixel of the first image. The second image is the other of the overlay image and a main image. In one embodiment, the method includes retaining each pixel of the second image that is in a location that corresponds to the location of a transparent pixel. In an embodiment, the method includes replacing the luma component of each pixel of the second image that is in a location that corresponds to the location of an intermediate pixel with a luma value that is equivalent to the two's complement of the luma value of the corresponding intermediate pixel.

The invention is directed to an apparatus that comprises, in one embodiment, a memory to store image data and a unit. The unit includes a comparing device and a writing device. The comparing device determines, for each pixel in a first image, that the pixel is: (a) an opaque pixel when the luma value of the pixel is within an opaque range that is greater than or equal to a minimum value and lower than a first predetermined value; (b) a transparent pixel when the luma value of the pixel is within a transparent range that is less than or equal to a maximum value and greater than a second predetermined value; or (c) an intermediate pixel when the luma value of the pixel is within an intermediate range that is greater than the first predetermined value and less than the second predetermined value. The first image is one of an overlay image and a main image. The images are defined by a plurality of pixels, each pixel being defined by at least a luma component and a color component. The writing device, in one embodiment, replaces a pixel of the first image that is in a location that corresponds to the location of an opaque pixel in the second image. The second image is the other of the overlay image and a main image. The writing device replaces the pixel with the corresponding opaque pixel of the second image. In one embodiment, the first image is the main image and the second image is the overlay image. In addition, in one embodiment, the writing device does not replace the pixel of the main image that is in a location that corresponds to the location of a transparent pixel of the overlay image. Further, in one embodiment, the writing device replaces the luma component of the pixel of the main image that is in a location that corresponds to the location of an intermediate pixel of the overlay image with a luma value that is equivalent to the two's complement of the luma value of the corresponding intermediate pixel of the overlay image.

The invention is directed to a system that comprises, in one embodiment, a display device, at least one image data source, a memory to store image data, and a unit. The unit includes (a) a comparing device, and (b) a writing device. The comparing device determines, for a pixel in one of an overlay image and a main image, that the pixel is: (a) an opaque pixel when the luma value of the pixel is within an opaque range that is greater than or equal to a minimum value and lower than a first predetermined value; (b) a transparent pixel when the luma value of the pixel is within a transparent range that is less than or equal to a maximum value and greater than a second predetermined value; or (c) an intermediate pixel when the luma value of the pixel is within an intermediate range that is greater than the first predetermined value and less than the second predetermined value. The images are defined by a plurality of pixels, each pixel being defined by at least a luma component and a color component. The writing device replaces a pixel of a first image that is in a location that corresponds to the location of an opaque pixel in a second image with the corresponding opaque pixel of the second image. The second image is the other of the overlay image and a main image. In one embodiment, the writing device does not replace the pixel of the main image that is in a location that corresponds to the location of a transparent pixel of the overlay image. In addition, in one embodiment, the writing device is replaces the luma component of the pixel of the main image that is in a location that corresponds to the location of an intermediate pixel of the overlay image with a luma value that is equivalent to the one's complement of the luma value of the corresponding intermediate pixel of the overlay image.

The invention is directed, in one embodiment, to a machine readable medium that embodies a program of instructions that may be executed by a machine, that, when executed by the machine, performs a method for determining, for a pixel in a first image, that the pixel is: (a) an opaque pixel; (b) a transparent pixel; or (c) an intermediate pixel. A pixel is considered an opaque pixel when the luma value of the pixel is within an opaque range that is greater than or equal to a minimum value and lower than a first predetermined value. A pixel is considered a transparent pixel when the luma value of the pixel is within a transparent range that is less than or equal to a maximum value and greater than a second predetermined value. A pixel is considered an intermediate pixel when the luma value of the pixel is within an intermediate range that is greater than the first predetermined value and less than the second predetermined value. In addition, the first image is one of: (a) an overlay image; and (b) a main image. Each pixel of the main and overlay images is defined by a luma component and at least one color component. Each luma component takes a value within a luma range, the lowest and highest values in the luma range being, respectively, a minimum value and a maximum value. Further, the method, in one embodiment, includes replacing each pixel of a second image that is in a location that corresponds to the location of an opaque pixel in the first image. The pixel of the second image is replaced with the corresponding opaque pixel of the first image. The second image is the other of the overlay image and a main image. In one embodiment, the method includes retaining each pixel of the second image that is in a location that corresponds to the location of a transparent pixel. In an embodiment, the method includes replacing the luma component of each pixel of the second image that is in a location that corresponds to the location of an intermediate pixel with a luma value that is equivalent to the two's complement of the luma value of the corresponding intermediate pixel.

The objectives, features, and advantages of the invention will be more readily understood upon consideration of the following detailed description of the invention, taken in conjunction with the accompanying drawings.

BRIEF DESCRIPTION OF THE DRAWINGS

FIG. 2*a* illustrates a main image stored in a frame buffer.

FIG. 2*b* illustrates an overlay image stored in the frame buffer of FIG. 2*a* in a destructive write operation.

FIG. 10 illustrates an overlay image stored in a memory and a scaled overlay image stored in another memory.

FIG. 13 illustrates the overlay image of FIG. 12 stored in the portion of the frame buffer of FIG. 6 according to the invention.

FIG. 14 illustrates the image that results when the image data of FIG. 13 is rendered.

DETAILED DESCRIPTION

Figure 1:
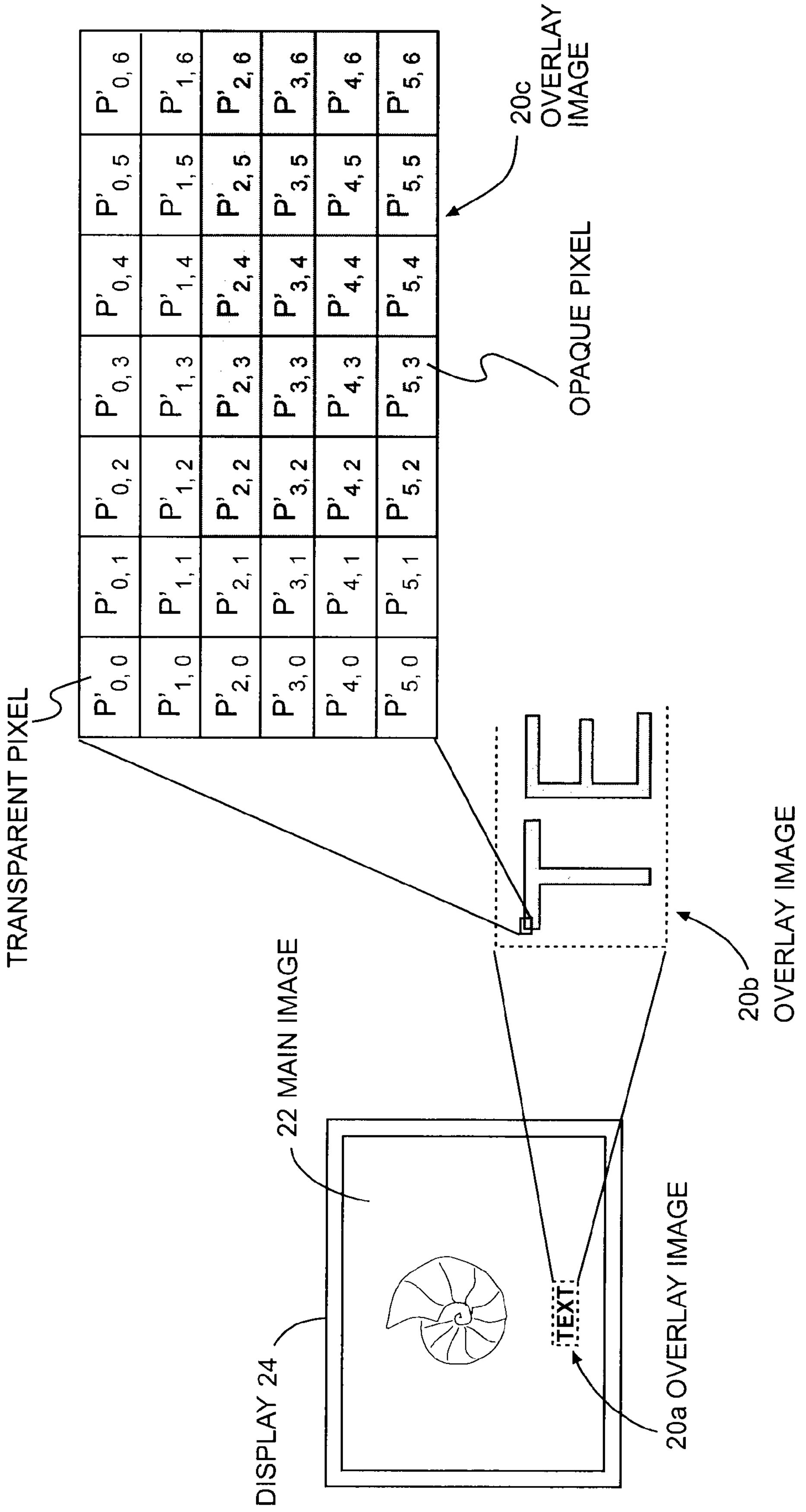
FIG. 1 illustrates a display device rendering a main image and an overlay image, and enlarged views of the overlay image.

The present invention is generally directed to methods and apparatus for creating an image that is a combination of a main image and an overlay image. In one embodiment, the image is created in a manner that reduces the appearance of artifacts that can result when main and overlay images having reduced color resolution are combined. Reference will now be made in detail to the present preferred embodiments of the invention, examples of which are illustrated in the accompanying drawings. Wherever possible, the same reference numbers are used in the drawings and the description to refer to the same or like parts.

In a computer system, the image on a display screen is formed from an array of small discrete elements commonly known as "pixels." The pixel array has numerous rows and columns, and each pixel can be identified by a unique row and column address. The pixel array that fills a display screen is often referred to as a "frame." The attributes of a pixel, such as its brightness and color, are represented by numeric values, and color pixels are defined in one of several models used for describing a gamut of colors. Commonly, color pixels are defined in terms of three 8-bit components for a total of 24 bits per pixel. When represented by 8-bits, 256 values for each component are possible.

Pixels defined in the YCbCr color space are described by a luma component (Y), and two chroma components (Cb, Cr).

In the YCbCr color space, luma (Y) refers to a quantity representative of luminance. The term "color-difference" is used herein as having the same meaning as "chroma." In the art, the term "YUV" is sometimes used to refer to the YCbCr color space. In this description, the term YUV is used to refer to the YCbCr color space, e.g., Y=Y, U=Cr, and V=Cb. In addition, the terms "sample" and "component" are used herein as having the same meaning.

Chroma subsampling is usually expressed in terms of the number of each of three types of component in a sample area, i.e., #:#:#. The sample area is often four pixels and common sample formats include: 4:2:2, 4:2:0, 4:1:1. In the 4:2:0 format, one color-difference component has half the sample rate of the luma components, and alternate color-difference components are sampled in alternate lines. In a preferred embodiment, the inventions disclosed herein are for use with reduced color-resolution image data in the 4:2:0 format.

In a YUV color model, pixels are defined by a luma or brightness component (Y), and two color difference components (U, V). The YUV color model permits the color resolution of an image to be reduced by chroma subsampling. As one example, consider the YUV 4:2:0 sampling format. For each of 2×2 matrix of four pixels, the luma values of all four pixels are sampled, but only one U and one V value are sampled. (A 2×2 block of pixels is also referred to herein as a "tile.") Thus, in the 4:2:0 sampling format, four pixels are represented by four Y components and one U and one V component. See FIG. 3. This may be contrasted with an image that is not subsampled. In the 4:4:4 format, for example, there is a Y, U, and V sample for each pixel in the tile.

The pixel values in a display device are generally updated or "refreshed" in a raster scan pattern, that is, from side-to-side in lines from top-to-bottom. In addition, pixels are often stored in memory, fetched from memory, and written to display devices in raster order. It is common to provide a memory for storing a frame of pixels and this memory is commonly referred to as a display or frame buffer.

To keep the size of memory to a minimum in a computer system, rather than storing the main and overlay image in separate memories, both images are sometimes stored in the frame buffer. Typically, the main image is stored first, and then the overlay image is stored. When the overlay image is stored, it is stored in a "destructive" write operation. That is, each main image pixel that "lies underneath" the overlay image is overwritten in the write operation.

An overlay image may be provided by a host or some other source. Rather than providing an irregularly shaped overlay image, such as one that follows the contours of characters, symbols, or icons, it is typically more efficient for the source to provide a rectangular overlay image. Accordingly, the overlay image is commonly provided by the source as a rectangular image. In systems where the main and overlay images are both stored in the frame buffer, these rectangular overlay images may include two types of pixels: "opaque" pixels, which are the pixels used to form the letter, symbol, or icon, and "transparent" pixels, which are the pixels that fill in the portions of the rectangular image not occupied by the symbol. As one example, in the YUV color space, the component values for overlay image pixels are:

| Pixel | Y | U | V |
|---|---|---|---|
| Transparent | 235 | 112 | 112 |
| Opaque | 16-234 | 112 | 112 |

FIG. 1 illustrates a display device 24 rendering a main image 22 and an overlay image 20*a*. The main image 22 fills the display screen. FIG. 1 also shows two enlarged views of the overlay image: 20*b* and 20*c*. On the display device 24, the overlay image 20*a* is shown superimposed on the exemplary main image 22. The dashed line surrounding the word "TEXT" is shown only for the purpose of illustrating the borders of the rectangular overlay image. On an actual display screen, the word "TEXT" would appear superimposed on the main image 22; the dashed line should not be visible. An enlarged portion of the overlay image is shown in FIG. 1 as overlay image 20*b*. Zooming further in, a further enlarged portion of the overlay image is shown as overlay image 20*c*, in which individual pixels can be seen. Each pixel "$P'_{R, C}$" has an address that is specified by row and column subscripts. The apostrophe is used to designate that the pixel is an overlay pixel. (Main image pixels are differentiated from overlay image pixels in the discussion that follows by the absence of an apostrophe.) This block of pixels includes the upper left corner of the letter "T." In the zoomed-in portion 20*c*, the shaded pixels represent part of the letter T, and the un-shaded pixels represent the area immediately outside the letter. The shaded pixels of the overlay image are "opaque," and the un-shaded pixels are "transparent." While the transparent pixels are part of the rectangular overlay image, when the image is rendered on the display device, main image pixels should be displayed where the transparent pixels are shown. For example, in the location where the pixel $P'_{0,0}$ is shown, a pixel of the main image should be rendered on the display.

FIGS. 2*a*-*b* illustrate a process of storing the main image 22 in a frame buffer 26 and then storing an overlay image 20 in a destructive write operation. The display device 24 may, for example, have a resolution of 320×240 pixels, requiring a frame buffer 26 with the capacity to store 76,800 pixels. Because it is impractical to depict the entire frame buffer, FIG. 2*a* shows only a portion 28 of the frame buffer 26 employed for storing the frame to be displayed on the display device 24. Further, the frame buffer portion 28 is an abstraction in that each memory location is shown as storing an entire pixel in a one-to-one correspondence with the rows and columns of the image. One of ordinary skill in the art will appreciate that pixels may be stored in a memory in a wide variety of different ways; FIGS. 2*a*-*b* are provided only to generally illustrate the process of storing a main image and then storing an overlay image in a destructive write operation.

FIG. 2*a* shows a portion of a main image 22 that has been stored in the frame buffer 26. The pixels of the main image are designated "$P_{R, C}$." It is desired to overlay this rectangular portion of the main image with the overlay image 20*c* depicted in FIG. 1. This portion of the main image has a start and stop row, and start and stop column, that is, it begins with row 10, column 5 and ends with row 15, column 11.

FIG. 2*b* shows the frame buffer 26 after the overlay image 20*c* (FIG. 1) has been stored in a destructive write operation. As mentioned above, the pixels of the overlay image are designated with an apostrophe, as "$P'_{R, C}$." FIG. 2*b* shows that the opaque (shaded) overlay pixels are stored in the memory, but the transparent overlay pixels are not stored in the memory. Main image pixels remain stored in the memory in locations corresponding to the transparent pixels.

The contents of the frame buffer portion 28 depicted in FIG. 2*b* are created as follows. As the overlay image 20*c* is written to memory, the luma value of each overlay pixel is examined. If a pixel is opaque (e.g., Y≠235), it is stored in the memory. When an opaque pixel is stored, the main image pixel at the corresponding location is overwritten. However, if the pixel is transparent (e.g., Y=235), it is discarded and the main image pixel at that location is preserved.

In addition to illustrating the replacement of pixels of a main image with pixels of an overlay image, FIGS. 2*a*-*b* illustrate a correspondence between pixels of the main and overlay images. Each pixel of the main and overlay images can be uniquely identified by a row and column address in their respective images. For example, FIG. 2*a* shows main image pixels in rows 10 to 15, columns 5 to 11. FIG. 1 shows overlay image pixels in rows 0 to 5, columns 0 to 6. When main and overlay images are combined, each overlay pixel is mapped into a unique row and column address in the main image. Thus, when a portion of the main image is specified to be overlaid, a correspondence is defined between each overlay pixel and a unique main image pixel. As one example, the overlay image pixel $P'_{0,0}$ (FIG. 1) corresponds to main pixel $P_{10,5}$ (FIG. 2*a*). As another example, the overlay pixel $P'_{5,6}$ corresponds to main pixel $P_{15,11}$.

Figure 3:
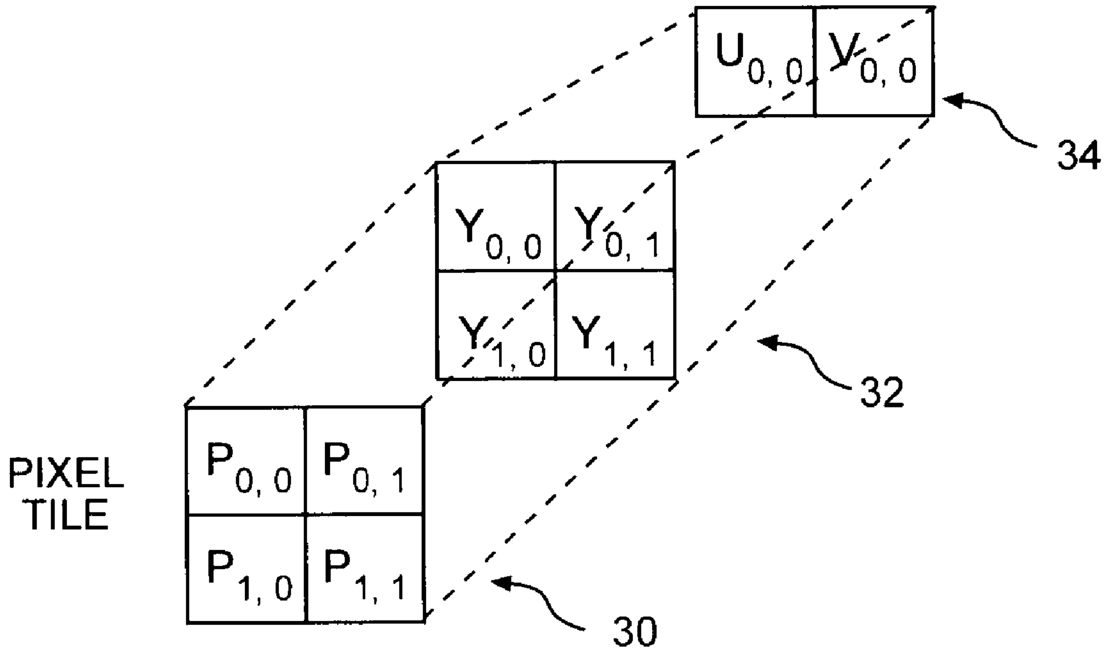
FIG. 3 illustrates a 2×2 tile of YUV 4:2:0 pixels and associated pixel components.

FIG. 3 illustrates a 2×2 tile of YUV 4:2:0 pixels. Just as there is a correspondence between overlay and main image pixels, there is a correspondence between overlay and main image tiles. For example, the overlay image pixel tile $P'_{0,0}$, $P'_{0,1}$, $P'_{1,0}$, and $P'_{1,1}$ corresponds to the main image pixel tile $P_{10,5}$, $P_{10,6}$, $P_{11,5}$, and $P_{1,6}$.

Figure 4:
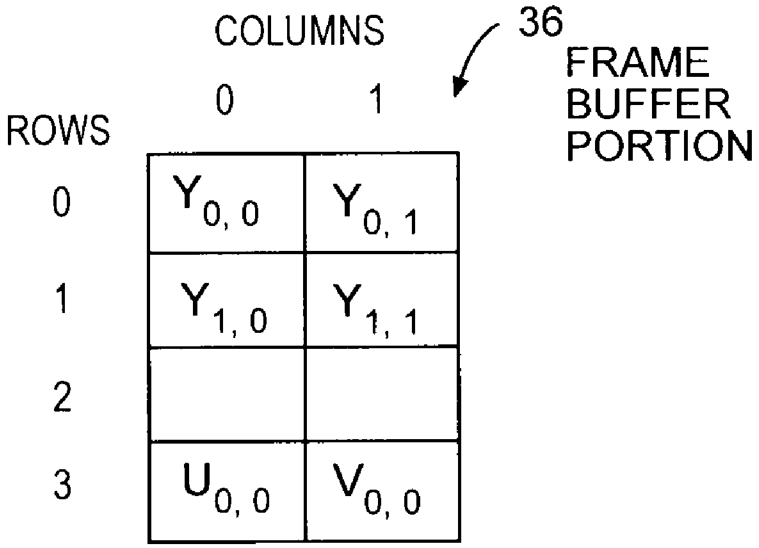
FIG. 4 illustrates the pixel tile of FIG. 3 stored in a portion of a frame buffer memory in which each memory location stores one pixel component.

FIG. 3 also shows that the tile 30 is made up of Y components 32 and U, V components 34. As can be seen from the figure, all four pixels share the same U, V values. FIG. 4 shows how the reduced color-resolution tile 30 is stored in memory. FIG. 4 shows a portion 36 of a frame buffer in which each memory location stores a pixel component. The components of the tile 30 of FIG. 3 are stored at the memory locations shown.

Figure 5:
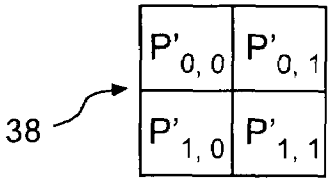
FIG. 5 illustrates an overlay image comprised of one tile of opaque pixels.
Figure 6:
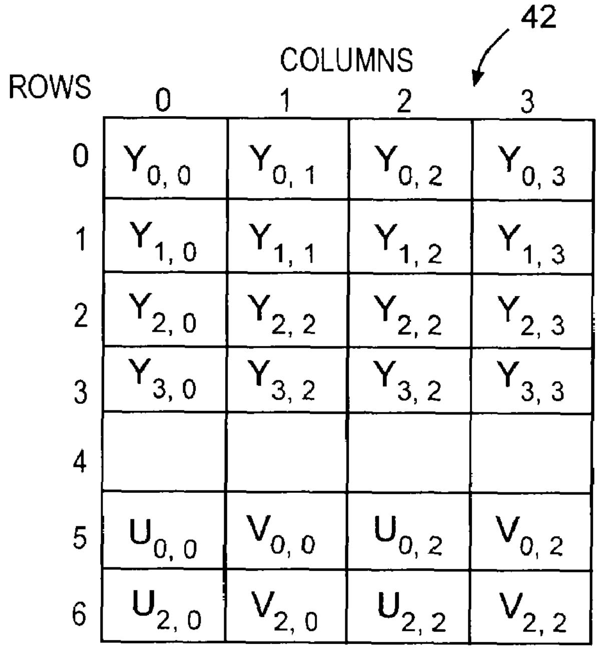
FIG. 6 illustrates image data defining part of a main image stored in a portion of a frame buffer.
Figure 7:
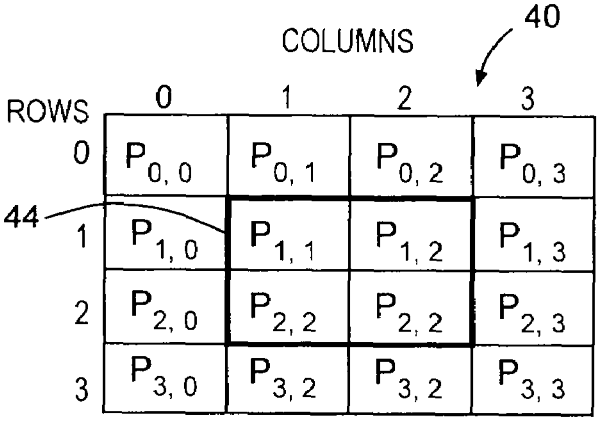
FIG. 7 illustrates the part of the main image of FIG. 6 and a region of the image designated to be overlaid with an overlay image.
Figure 8:
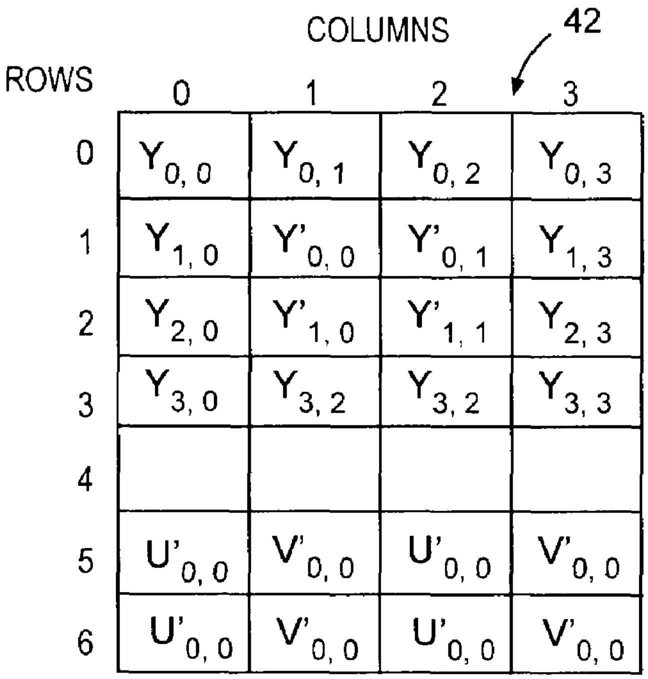
FIG. 8 illustrates the overlay image of FIG. 5 stored in the portion of the frame buffer of FIG. 6 in a destructive write operation.

As mentioned, an artifact can appear in an image created when a main and overlay image are combined. One reason an artifact may appear is because the tiles of the main and overlay image are not "aligned" with one another in memory. Referring again to FIG. 4, it can be seen that the pixel components for a reduced color-resolution tile is stored in six memory locations. If, when combining images, the pixel components of an overlay image tile are stored in the same six memory locations as the pixel components of the corresponding main image tile, the overlay and main image tiles may be considered aligned in memory. In other words, if the memory locations of the pixel components of the overlay image tile correspond to the memory locations of the pixel components of the corresponding main image tile, the tiles may be considered aligned in memory. However, if the memory locations of the pixel components of the overlay image tile correspond to memory locations of pixel components for more than one main image tile, the tiles may not be considered aligned in memory. As described below, FIG. 8 illustrates a main image and a non-aligned overlay tile stored in a memory. FIGS. 5-7 provide context for FIG. 8.

FIG. 5 illustrates an overlay image comprised of a single tile of opaque pixels. While an overlay image generally includes many tiles, an artifact that results from misalignment may be illustrated with an overlay image that consists of the single tile 38. The pixels of the exemplary tile 38 are in the YUV 4:2:0 format and all four pixels are opaque.

FIG. 6 shows YUV data for a portion of a main image 40 stored in a frame buffer portion 42. Like the overlay image, the main image is in the YUV 4:2:0 format. In addition, each pixel component of the main and overlay images are defined by and each memory location stores 8 bits. The representation of the frame buffer portion 42 in FIG. 6 is similar to the frame buffer portion 36 (FIG. 4), the main difference being that four pixels are stored in the frame buffer portion 36, while 16 pixels are stored in the frame buffer portion 42.

FIG. 7 illustrates the portion of the main image 40 that is represented by the data stored in the frame buffer portion of FIG. 6. As shown by rectangle 44 of FIG. 7, a four pixel region of the main image portion is designated for overlaying with an overlay image. This region begins at row 1, column 1 and continues to row 2, column 2.

When the overlay image 38 is written to memory, the luma value of each overlay pixel is examined. If a pixel is opaque (e.g., Y≠235), it is stored in the memory in a destructive write operation. When an opaque pixel is stored, the main image pixel at the corresponding location is overwritten. If a pixel is transparent (e.g., Y=235), the pixel is discarded and the main image pixel at that location is preserved. As all of the pixels of overlay image 38 are opaque, all are stored. The results are shown in FIG. 8.

FIG. 8 illustrates YUV data stored in the frame buffer portion 42. The YUV data is for the main image portion of FIG. 7 after it has been combined with data for the overlay image tile 38 of FIG. 5. The overlay tile 38 is stored as a non-aligned tile. In FIG. 8, the Y data values of the overlay pixels replace corresponding Y data values of the main image in the top portion (rows 0-3) of the frame buffer portion 42. For example, when the overlay pixel $P'_{0,0}$ was stored, the luma value $Y'_{0,0}$ was stored at the column 1, row 1 location, replacing value $Y_{1,1}$. In addition, the U, V data values of the overlay pixels replace corresponding U, V data values of the main image in the bottom portion (rows 5-6) of the frame buffer portion 42. Continuing the example, when the overlay pixel $P'_{0,0}$ is stored, color values $U'_{0,0}$ and $V'_{0,0}$ were stored at locations column 0, row 5, and column 1, row 5, replacing $U_{0,0}$ and $V_{0,0}$. Notice that U, V data values of the main image also replaced by the overlay data values: $U'_{0,2}$ and $V'_{0,2}$, $U'_{2,0}$ and $V'_{2,0}$, and $U'_{2,2}$ and $V'_{2,2}$. Because the U, V components of the overlay image tile correspond to memory locations of U, V components of more than one main image tile, the tiles may not be considered aligned in memory.

Figure 9:
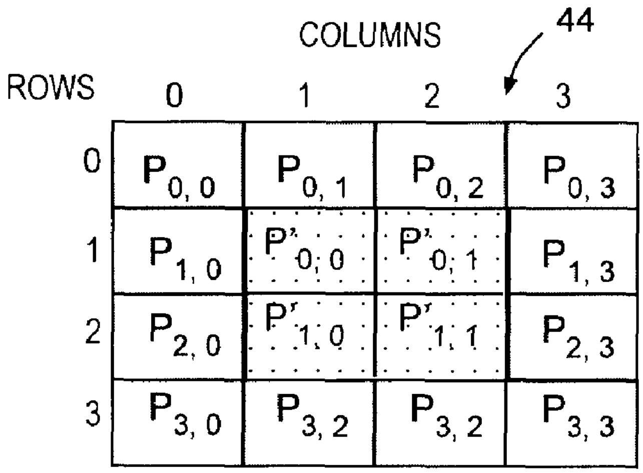
FIG. 9 illustrates the image that results when the image data of FIG. 8 is rendered.

FIG. 9 illustrates an image portion created from the portion of the main image of FIG. 7 and the overlay tile of FIG. 5 that results when the overlay tile is stored in the frame buffer portion as a non-aligned tile. In FIG. 9, an artifact appears in pixels immediately outside of the overlay image 38. For example, the main image pixels $P_{0,0}$, $P_{0,1}$, and $P_{1,0}$ are located immediately outside of the overlay image 38. The pixels $P_{0,0}$, $P_{0,1}$, and $P_{1,0}$ share the same U, V values, along with $P_{1,1}$. However, when the overlay image is stored, main image pixel $P_{1,1}$ is replaced by the overlay pixel $P'_{0,0}$. Before the overlay image was stored the pixels $P_{0,0}$, $P_{0,1}$, and $P_{1,0}$ had the shared U, V values of $U_{0,0}$, and $V_{0,0}$. After the overlay pixel $P'_{0,0}$ was stored, the values of $U_{0,0}$, and $V_{0,0}$ were changed to $U'_{0,0}$, and $V'_{0,0}$. In other words, the color information of the surrounding pixels was changed when the overlay image 38 was stored. In FIG. 9, the overlay pixels are rendered with both their color and luma information. The luma values of the pixels immediately outside of the overlay image did not change; only the color values changed. This change in color of the pixels immediately outside of the overlay image is one example of an artifact.

The artifact occurred because the tiles of the main image and overlay image were not aligned in memory. That is, if the overlay image tiles corresponded to different main image tiles, it may have been possible to avoid the artifact. For example, if the portion of the main image where it is desired to overlay the overlay image begins at row 2, column 2 and continues to row 3, column 3, an artifact would not have occurred. While it may sometimes be theoretically possible to avoid an artifact by forcing alignment in memory, it should be appreciated that such alignment may not be practical or possible in many cases.

For it to be practical, it must be known how the main image is stored before the overlay image is written, but this information may not be known beforehand. Moreover, it may not be possible to align the images. In the example above, the overlay image consisted of just one tile of four opaque pixels. More typically, however, the overlay image will comprise a large number of opaque and transparent pixels, arranged in a myriad of patterns. For example, suppose that a particular portion of the main image is specified to be overlaid with a "large" overlay image. The upper-left corner pixel of the portion of the main image to be overlaid is identified by a first row and column address. Assume further that when the overlay image is stored, a first artifact appears. To eliminate the artifact, the row and column address of the upper-left corner pixel of the portion of the main image to be overlaid is changed. However, when the overlay image is stored using the new row and column address for the corner pixel, a second artifact appears elsewhere in the image. In other words, aligning tiles in one part of an image may cause a tile misalignment in another part of the image. For this reason, it may not be possible to align the main and overlay images.

Figure 11:
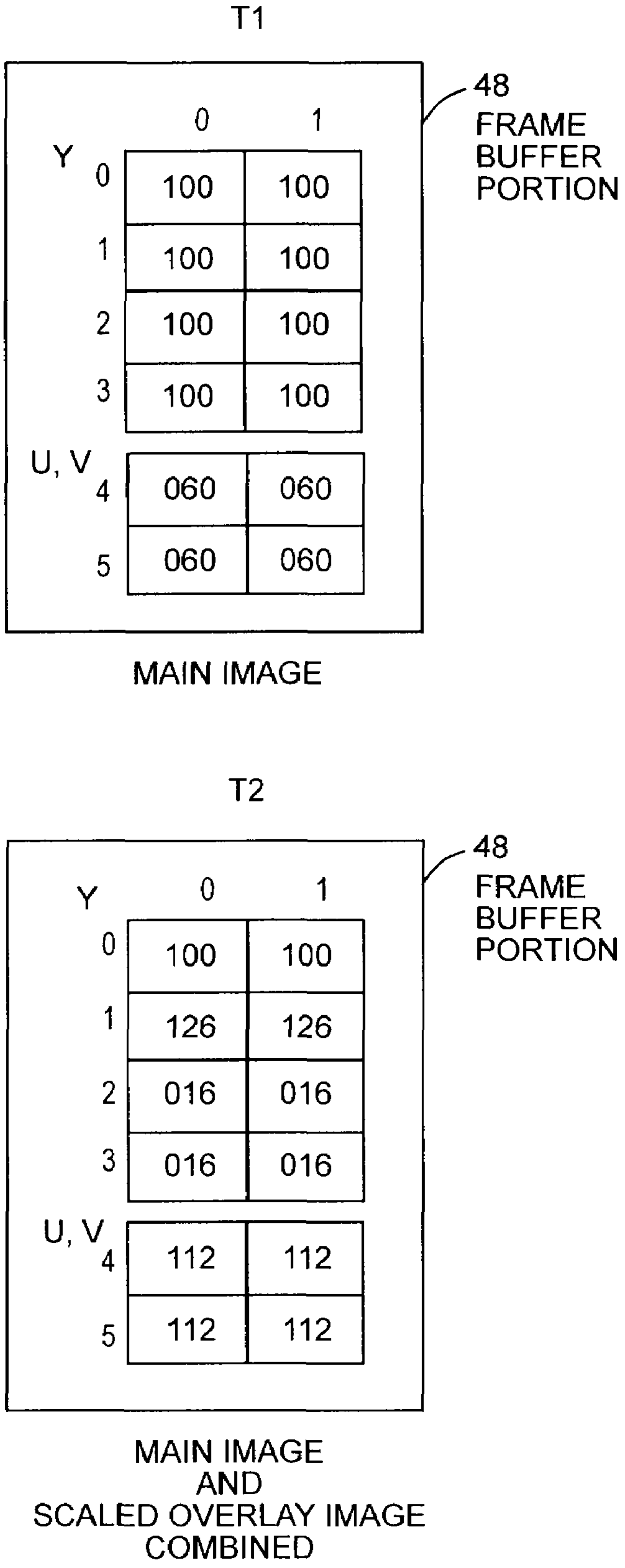
FIG. 11 illustrates a portion of a main image stored in a portion of a frame buffer before and after the scaled overlay image of FIG. 10 has been stored in the frame buffer portion.

Another reason an artifact may appear in a new image created from combining a main image and an overlay image is because one or more tiles of the overlay image include pixels that are a blend of opaque and transparent pixels. This can result, for example, from down-scaling the overlay image before storing it. FIGS. 10 and 11 illustrate how an artifact can result when an overlay image is scaled.

FIG. 10 shows image data defining an overlay image stored in a memory 44. FIG. 10 also shows image data defining a scaled overlay image stored in a memory 46. The overlay images are in the YUV 4:2:0 format and each pixel component is defined by 8 bits. The memories 44, 46 are similar to the frame buffer portion 42 depicted in FIG. 6. However, instead of pixel components being identified by row and column image position, i.e., $P_{R,\ C}$, decimal values for components are shown. The overlay image data stored in memory 44 defines eight 2×2 tiles of four pixels. The pixels are either opaque (Y=016-234) or transparent (Y=235), as shown. Two of the tiles of the overlay image stored in memory 44 include both opaque and transparent pixels (see rows 2 and 3). The scaled overlay image data stored in memory 46 is a down-scaled version of the overlay image data stored in memory 44. The scaled overlay image data stored in memory 46 defines two 2×2 tiles of four pixels. When tiles having both opaque and transparent pixels are down-scaled, i.e., those in rows 2 and 3 of memory 44, the resulting luma value is, in this example, the average value, i.e., 126. Thus, the luma values stored in row 1 of memory 46 are 126. The average value represents a blending of the luma values of opaque and transparent pixels.

FIG. 11 illustrates data defining a main image portion stored in a frame buffer portion 48 before and after the data defining the scaled overlay image of FIG. 10 has been stored in the frame buffer portion 48 in a destructive write. At a time T1, data defining a portion of a main image is stored in a frame buffer portion 48. The data is in the 4:2:0 format. At a time T2, data defining the scaled overlay image stored in memory 46 of FIG. 10 is stored in the frame buffer portion 48 following a destructive write operation. The time T2 is subsequent to the time T1. In the write operation, opaque pixels (e.g., Y≠235) of the scaled overlay image are stored, overwriting the main image pixels at the corresponding location. Transparent scaled overlay pixels (e.g., Y=235) are discarded, preserving the main image pixel at the corresponding locations. The contents of the frame buffer portion at T2 represents a portion of a new image created by combining the scaled overlay image with the main image portion.

Referring to FIG. 11, storing the scaled overlay image does not change the luma values of the main image pixel components stored in row 0; they remain at 100, as the Y components of the corresponding transparent scaled overlay pixel were discarded. In rows 1, 2 and 3, the luma values of the main image pixel components are replaced with the Y components of the corresponding opaque scaled overlay pixels; they are changed to 126 in row 1, and 016 in rows 2, 3.

However, storing the scaled overlay image changes the chroma values of the main image pixel components stored in rows 4 and 5; they are changed from 060 to 112. The chroma values of 112 are appropriate for the overlay scaled overlay pixels having Y components stored in rows 1-3. However, the chroma values of 112 are not appropriate the main image pixels having Y components stored in row 0. The appropriate U, V values for these main image pixels are 060. Thus, the color of the main image pixels in this example has changed as a result of storing a scaled overlay image. The changed color of these main image pixels will result in an artifact when the image is displayed. Like the artifact that results from misalignment described above, the storing of a scaled overlay image changes the color components, but not the luma components, of surrounding pixels.

In addition to the artifact associated with changing the color of the main image pixels, there is another artifact associated with the overlay image pixels. Referring to overlay image stored in memory 44 (FIG. 10), the demarcation dividing the main image from the overlay image is between row 2 and row 3. That is, the luma values for the pixels of row 2 are 235, and the luma values for the pixels of row 3 are 016. However, the contents of the frame buffer portion after the scaled overlay image has been stored (at time T2 in FIG. 11) does not show the same demarcation. The luma values for main image pixels in row 0 are 100, and the luma values for scaled overlay image pixels in rows 2 and 3 are 016, but in between, in row 1, the luma values for scaled overlay pixels are 126. Thus, scaling an image can create a border artifact. Moreover, as FIG. 11 shows, storing the scaled overlay image with the border artifact changes the luma, but not the chroma values, of the overlay pixels in the artifact regions, that is, on the border between the overlay and main images. This may tend to highlight the border artifact.

Sometimes the overlay image is a black or dark object on a white or light colored background. In this case, intermediate pixels will appear to have a color of transparent pixels (white) making the artifact quite visible in a form of white highlight around black object. In other cases, the overlay image is a white or light colored object on a black or dark background. In this situation, intermediate pixels will appear to have a color of transparent pixels (black) creating an artifact in the form of black or gray highlight around white object. In either case, the artifact is magnified when scaling is involved because the number of intermediate pixels around the object increases depending on the scaling ratio. In extreme instances, all of the pixels intended to be transparent pixels may become intermediate pixels. In this circumstance, the transparent pixels are displayed as if the intention was to display the overlay image without using transparent pixels.

It should be appreciated that similar artifacts may be created in ways not described above. It is not essential that an artifact be created in a particular way. The discussion of how artifacts may be created is provided in this specification solely for the purpose of illustrating some of the possible contexts for and to aid in understanding of the invention, which is next described.

Numerous embodiments of the invention are contemplated. Some embodiments are directed to methods and apparatus for creating an image that is a combination of reduced color-resolution main and overlay images. The images are combined in a manner that reduces the appearance of artifacts that can result when the reduced color-resolution images are combined.

According to one preferred method, the pixels of a main image are first stored in a memory. After the main image pixels are stored, overlay image pixels are stored in the memory. Each pixel of the main and overlay images is defined by a luma component and at least one color component. In addition, each luma component takes a value within a luma range. The lowest and highest values in the luma range being, respectively, a minimum luma value and a maximum luma value. In one preferred embodiment, the main and overlay images are defined in the YUV 4:2:0 color space, each pixel component is 8-bits, and luma components can take any value in a luma range from a minimum of 16 to a maximum of 235.

The method includes a step of determining, for each pixel in the overlay image, whether the overlay pixel is an opaque, transparent, or intermediate pixel. An opaque pixel is a pixel having a luma value within an opaque range, a transparent pixel is a pixel having a luma value within a transparent range, and an intermediate pixel is a pixel having a luma value within an intermediate range. In an embodiment, the opaque range includes luma values that are greater than or equal to the minimum luma value and less than or equal to a first predetermined value. In addition, in an embodiment, the transparent range includes luma values that are less than or equal to the maximum luma value and greater than or equal to a second predetermined value. Further, in an embodiment, the intermediate range includes luma values that are greater than the first predetermined value and less than the second predetermined value. In one embodiment, opaque, transparent, and intermediate pixels are defined by the ranges as shown in the table below, where the minimum luma value is 16, the maximum luma value is 235, the first predetermined value is 23, and the second predetermined value is 228.

| Pixel | Luma Value |
|---|---|
| Transparent | 228 to 235 |
| Opaque | 16 to 23 |
| Intermediate | 24 to 227 |

Moreover, the method, in an embodiment, includes a step of replacing each pixel in the main image with a corresponding opaque pixel (of the overlay image) if the main image pixel is in a location in the image that corresponds to the location of an opaque pixel. The method may include a step of retaining each pixel of the main image that is in a location that corresponds to the location of a transparent pixel. In addition, the method, in an embodiment, includes a step of replacing the luma component of each pixel in the main image with a luma value that is equivalent to the two's complement of the luma value of a corresponding intermediate pixel (of the overlay image) if the main image pixel is in a location in the image that corresponds to the location of an intermediate pixel. In an alternative embodiment, the replacement luma value is a value that is equivalent to the one's complement of the luma value of the corresponding intermediate pixel.

As will be appreciated by one of ordinary skill in the art, the two's complement of a binary number is obtained by inverting each bit and adding 1 to the result. To obtain the one's complement of a binary number, each bit is inverted. For example, the two's complement of the 8-bit binary number 1110 0110 (230d) is 0001 1010 (26d), and the one's complement is 0001 1001 (25d).

Figures 12, 15:
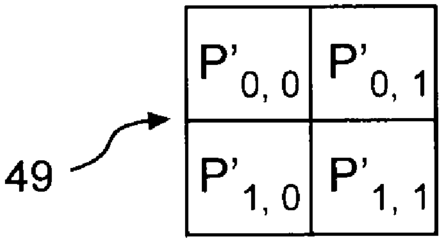
FIG. 12 illustrates an overlay image comprised of a one tile of intermediate pixels.
FIG. 15 shows the two's complement luma values for the overlay image of FIG. 12.

One example of the invention is illustrated in FIGS. 12, 13, 14, and 15. FIG. 12 illustrates an overlay image 49 of a single tile of pixels. The pixels of the exemplary tile 49 are in the YUV 4:2:0 format. FIG. 12 also shows the numeric values of the components of the pixels of tile 49. The luma values are 100 and the chroma values are 112. Accordingly, all four pixels are, in one example embodiment, intermediate pixels.

FIG. 13 illustrates the data for the overlay tile 49 of FIG. 12 stored in the frame buffer portion 42 according to the invention. In FIG. 13, it is assumed that the data defining the main image portion of FIG. 7 has been previously stored in the frame buffer portion 42. Subsequently, the overlay tile 49 is stored in a destructive write operation in the frame buffer portion 42 as a non-aligned tile. Preferably, the main image is in the YUV 4:2:0 format, each pixel component of the main and overlay images are defined by 8 bits, and each memory location stores 8 bits. In this example, the portion of the main image designated for overlaying an overlay image is the same as that shown in FIG. 7. According to the invention, because the pixels of the tile 49 are intermediate pixels, the luma components of certain pixels in the main image are replaced. The replacement luma value is equivalent to the two's complement of the luma value of the corresponding overlay pixel. An asterisk, i.e., "Y*" is used to designate replacement luma values. The pixels selected to have their luma components replaced are those with a luma value that is in a location that corresponds to the location of an overlay pixel. Notice, however, that the chroma values are not replaced.

FIG. 15 illustrates the two's complement luma values for the image data of the overlay image 49 of FIG. 12. Comparing FIGS. 12 and 15, it can be seen that in this example the two's complement luma values are larger, i.e., they are brighter, than the luma values of the overlay image, producing pixels that are a lighter shade of the main image color.

Comparing FIGS. 8 and 13, one advantage of the invention can be seen. The chroma values in FIG. 8 are the chroma values of the overlay image. This causes an artifact, namely, it causes a color change in the pixels immediately outside of the overlay image. In contrast, the chroma values in FIG. 13 are the chroma values of the main image. Accordingly, an advantage of the invention is that the storing of an overlay image may be accomplished without changing the color of pixels immediately surrounding the overlay image. Thus, the invention may eliminate an artifact.

FIG. 14 illustrates an image portion created from the main image data of FIG. 13 and the data defining the overlay tile of FIG. 12 that results when the overlay tile is stored in the frame buffer portion according to the invention. In FIG. 9, the overlay pixels are rendered with the color information of the main image and with the luma information that is the complement of the overlay pixels. As can be seen in FIG. 14, the color of the pixels immediately outside of the overlay image retain their color and luma values. In addition, the overlay image pixels take the color of the main image and the luma that is the complement of their original luma. In this example, this results in pixels that are a lighter shade of the main image color. While the color and luma information of the overlay image changes, the inventors have observed that these changes to the overlay image are less conspicuous than the artifact that results when the color information of the background image is changed.

Figure 16:
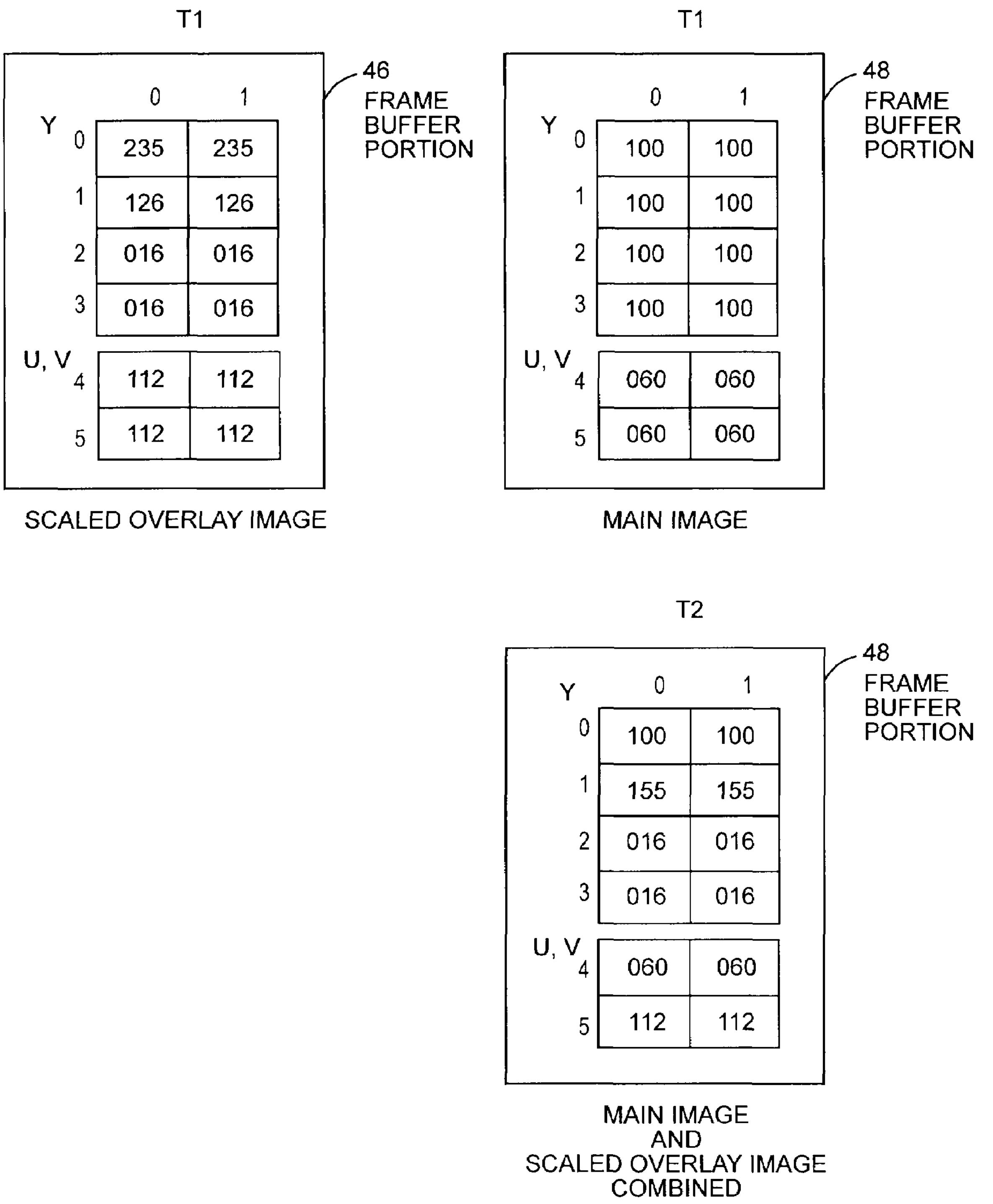
FIG. 16 illustrates the scaled overlay image of FIG. 10 stored in a memory, the main image portion of FIG. 11 stored in another memory before and after the overlay image of FIG. 10 is stored in the other memory.

As described above, an artifact may also appear in a new image created from combining a main image and an overlay image because one or more tiles of the overlay image includes pixels that are a blend of opaque and transparent pixels. As mentioned, this may be caused by down-scaling the overlay image before storing it. FIG. 16 illustrates how the invention may prevent or make less conspicuous artifacts that arise when storing a scaled overlay image.

FIG. 16 shows data defining a scaled overlay image stored in a portion of a frame buffer memory 46. This is the same data that is stored in the memory 46 of FIG. 10. FIG. 16 also illustrates a portion of a frame buffer portion 48 at two times T1, and T2. At time T1, a main image is stored in the frame buffer portion 48. The time T2 is subsequent to time T1. At time T2, the scaled overlay image is stored in frame buffer 46 in a destructive write operation.

Referring to the frame buffer portion 48 shown in FIG. 16 at time T2, in row 0, the luma values (100) of the main image are retained, as the luma values (235) of the corresponding scaled overlay pixels fall within an exemplary transparent range (228-235). In row 1, the luma values (100) of the main image are replaced, as the corresponding scaled overlay pixels have luma values (126) falling in an exemplary intermediate range (24-227). The replacement luma values (155) for row 1, in this example, are the two's compliment of the luma value of the corresponding main image pixel. (The two's compliment of 100d is 155d.) In rows 2-3, the luma values (016) of the scaled overlay image are stored, as these scaled overlay pixels have luma values falling in an exemplary opaque range (16-23). In row 4, the chroma values (060) of the main image pixels are retained. Finally, in row 5, the chroma values (112) of the scaled overlay image are stored.

Comparing FIGS. 11 and 16, one advantage of the invention can be seen. When the pixels that correspond to the luma values in row 0 (FIG. 16, Frame Buffer 48, T2) are rendered, the main image pixels retain their original chroma components (060). In contrast, in the previous example depicted in FIG. 11, the corresponding main image pixels in that example take the color components (112) of the overlay image. Thus, when one method of the invention is practiced, an artifact associated with the main image pixels may be eliminated.

In addition, it should be noted that when the pixels that correspond to the luma values in row 1 (FIG. 16, Frame Buffer 48, T2) are rendered, they will take the two's compliment of the luma component (155) of the corresponding overlay image pixel, but will retain the chroma components (060) of the corresponding main image pixel. In contrast, in the previous example depicted in FIG. 11, the corresponding main image pixels are replaced with both the luma components (126) and the color components (112) of the overlay image. While the pixels in row 1 will appear as an artifact, the inventors have found that it is less conspicuous than the artifact that results when the previous example depicted in FIG. 11 is rendered.

Figure 17:
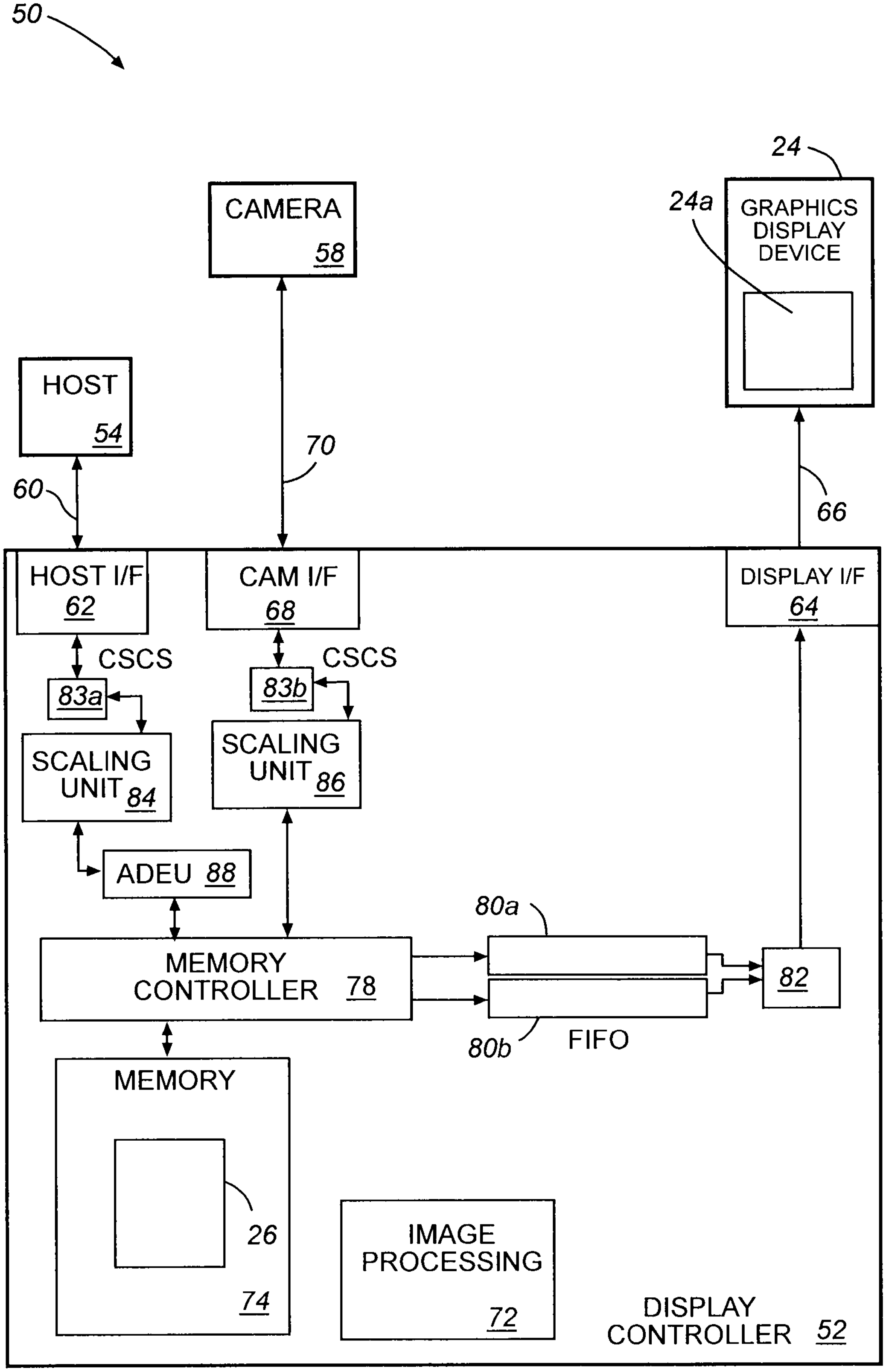
FIG. 17 is a block diagram of a computer system illustrating a preferred embodiment of the invention.

Other embodiments are directed to systems and apparatus. Turning now to FIG. 17, a computer system 50 is shown. The system 50 is one preferred context for the invention. The computer system 50 may be a general or special purpose computer. In addition, the computer system 50 may be a standalone system or may be embedded in another machine or system. In one embodiment, the computer system 50 is a portable digital appliance that is primarily powered by a battery (not shown). Although system 50 may be embodied in a single device, in some implementations certain components of system 50 may be remote or physically separated from other components of system 50. Further, although system 50 is illustrated as including discrete components, these components may be implemented in hardware, software, firmware, or a combination of one or more of these elements. When implemented in hardware, some components of system 50 may be combined in a particular IC or device.

The computer system 50 includes a display controller 52. In an embodiment, the system 50 may be a digital system or appliance. Where the system 50 is a portable digital appliance, it is typically powered by a battery (not shown). The system 50 typically includes a host 54, a display device 24, and a camera module 58. The display controller 52 drives the display device 24 and interfaces the host 54 and the camera module 58 with the display device.

The host 54 is typically a microprocessor, but may be a digital signal processor, a computer, or any other type of controlling device adapted for controlling digital circuits. The host 54 communicates with the display controller 52 over a bus 60 that is coupled with a host interface 62 in the display controller 52.

The display controller 52 includes a display device interface 64 for interfacing between the display controller and the display device 24 over display device bus 66. LCDs are typically used as display devices in portable digital appliances, such as mobile telephones, but any devices capable of rendering pixel data in visually perceivable form may be employed. In a preferred embodiment, the display device 24 is an LCD that has a display area 24*a*. In another preferred embodiment, the display device 24 is a printer. In addition, the display controller 52 includes a camera interface 68 ("CAM I/F") for receiving pixel data output on data lines of a bus 70 from the camera 58.

Preferably, the display controller 52 is a separate IC from the remaining elements of the system, that is, the display controller is "remote" from the host, camera, and display device.

A number of image processing operations may be performed on data provided by an image data source, such as the host or the camera. Such image processing operations may be performed by units included in an image processing block indicated generally as 72 in FIG. 6. The image processing block 72 may include, for example, a CODEC for compressing and decompressing image data.

In one embodiment, the display controller 52 includes a memory 74 for storing frames of image data in a frame buffer 26. In other embodiments, however, the memory 74 may be remote from the display controller. Data are stored in and fetched from the memory 50 under control of a memory controller 78. The memory 74 is preferably an SRAM, however, any type of memory may be employed.

Typically, the image data stored in the memory 26 are fetched and transmitted through a plurality of parallel display pipes 80 (e.g., 80*a*, 80*b*), which are preferably FIFO buffers. The output of the display pipes 80 are passed through a selecting unit 82 for selecting data from one of the pipes 80. Image data are transmitted from the selecting unit 82 through the display device interface 64 and output bus 66 to the display device 24.

In an embodiment, the display controller 52 includes color space conversion and chroma subsampling units 83*a*, and 83*b* ("CSCS"). In addition, the display controller 52 preferably includes scaling units 84, 86 for scaling and cropping image data received from the host 54 and the camera 58, respectively. However, in other embodiments, a single scaling unit may be shared for use with data from multiple sources.

An example illustrates operation of the system 50. A main image is presented to the display controller 58 by the camera. The image is optionally scaled as it is received for storage in the frame buffer 26. Alternatively, the host or another image data source provides the main image. Preferably, the image data is in a 4:4:4 format, and the image data is converted and sampled by CSCS unit 83_b_ so as to be placed into the YUV 4:2:0 format, but this in not essential. In other embodiments, the image data may be provided in other color models and sampling formats.

After the main image is stored in the frame buffer 26 via the memory controller 78, the host presents an overlay image. Preferably, the overlay image data is in a 4:4:4 format, which is then down-scaled by the scaling unit 84, and converted and chroma subsampled by CSCS unit 83_a_ so as to provide YUV 4:2:0 image data for storage in the frame buffer 26. The scaled overlay image preferably includes at least one pixel that will produce a scaling artifact when rendered on a display device. Alternatively, another image data source provides the overlay image.

The scaled overlay image is presented to an artifact disguising and eliminating unit ("ADE unit" or "ADEU") 88. The ADE unit 88 receives pixels, examines their Y components, and directs how they are to be processed as described below.

If the Y component is within an opaque range, e.g., Y=16-23, the ADE unit 88 causes the Y, U, and V components of the pixel to be stored in the frame buffer 26 over the main image previously stored in the memory. If the Y component indicates the pixel is within a transparent range, e.g., Y=228-235, the ADE unit 88 causes the Y, U, and V components of the pixel to be discarded, thereby leaving the corresponding main image pixel stored in the frame buffer intact. If the ADE unit 88 detects that the pixel is within an intermediate range, e.g., 24<Y<227, it causes the Y component of the pixel to be stored in the frame buffer 26, and the U and V components of the pixel to be discarded.

One of ordinary skill in the art will readily appreciate many ways in which the ADE unit 88 may be implemented in hardware. As one example, the ADE unit 88 may be implemented with a multiplexor and a comparator for controlling the select input of the multiplexor. As other examples, the ADE unit 88 may implemented with discrete combinational logic or via hardware definition language code.

In addition, invention is directed to a "machine readable medium" that includes any data storage device that can store data which can be thereafter read by a computer system. The phrase also includes an electromagnetic carrier wave in which the computer code is embodied. Examples include magnetic or optical disks, hard disk drives, memory chips of any type, and other similar memory devices. In one embodiment, the medium embodies a program of instructions that may be executed by a machine, such as a computer system. The program of instructions may be software, firmware, hardware code, or other similar program. The program of instructions, when executed by the machine, performs a method for selectively storing all, none, or some of the components of a pixel based on the luma value of the pixel.

In one preferred embodiment, transparent, opaque, and intermediate pixels are defined, respectively, by the following ranges: 228 to 235, 16 to 23, and 24 to 227. Although the present invention has been described principally in conjunction with these ranges, it should be appreciated that the invention is as applicable, if not more applicable, when used with other ranges. In another embodiment, transparent, opaque, and intermediate pixels are defined, respectively, by the following ranges: 248 to 255, 0 to 7, and 8 to 247. The invention is not limited to these two sets of ranges. The ranges may be adjusted as desired based on empirical results to achieve the least noticeable artifacts.

Embodiments and examples have been described with reference to the YCrCb, color model, which has been referred to as YUV. It should be appreciated that the applicability of the invention is not limited to this color model. The invention may be practiced with any color model, including but not limited to, the YUV, CMYK, CMY, YIQ, RGB, and XYZ color models.

In addition, in this specification, the 4:2:0 sampling format has been repeatedly referred to in this description of the invention. While the 4:2:0 sampling format is one preferred format, the invention is not limited to the 4:2:0 format, but may be practiced with any suitable format where artifacts similar to those described may result or where the color resolution of image data is reduced.

Furthermore, specific examples of ranges for luma and chroma components have been provided herein. It should be appreciated that these ranges are exemplary. The ranges may be adjusted as desired.

Additionally, this specification has referred to pixels components being 8 bits. The number of bits used for specifying components may be adjusted as desired. For example, the invention may be practiced with 1, 2, 4, 8 or 16 bits per sample.

Aspects of the invention have been described as multiple discrete steps being performed in a particular sequence. It should be understood, however, that the particular sequence in which the steps are presented is for the sole purpose of aiding the reader in understanding the present invention, and the order of description should not be construed to imply that such steps must necessarily be performed in the order of their presentation.

Although the present invention have been described principally in conjunction with storing an overlay image in a memory in which a main image was previously stored, it should be appreciated that the invention is as applicable, if not more applicable, when storing a main image in a memory in which an overlay image was previously stored. Thus, it should be appreciated that the invention is not limited to storing the main and overlay images in a particular order. Alternatively, the new image may be created as transmitted image data are received. In another alternative, main and image data may be combined into a new image according to the invention as the data is fetched from memory. For instance, a host may transmit an overlay image and a camera may transmit a main image. The new image may be created according to the invention on-the-fly as the two images are received. As another example, a main image may be stored in one portion of a general purpose memory and an overlay image stored in another portion of the memory. The new image may be created according to the invention on-the-fly as the two images are fetched from respective portions of the memory. As a further example, an overlay image may be first stored in a memory, and subsequently a main image is stored in the memory according to the invention.

Preferred embodiments of the invention provide a number of advantages. One advantage is that the color of the pixels immediately outside of an overlay image retain their color and luma values, completely eliminating an artifact. Another advantage the luma value of the overlay pixels immediately inside an overlay image are increased or decreased, making the appearance of the artifact associated with these pixels less noticeable.

Additionally, another advantage of the invention is associated with the font size that can be displayed. By employing a range of luma values for determining transparent color, the inventors have observed that the number of intermediate pixels is reduced, thereby reducing the apparent size of the artifact. In the case of scaling an overlay image, there exists a certain size or resolution threshold of text below which pixels intended to be transparent cannot be displayed as transparent. This threshold can be made lower when using a range of luma values to determine which pixels are transparent. This allows smaller opaque objects, like small text fonts to be displayed without pixels intended to be transparent being written to memory and consequently displayed. Further, as the number of intermediate pixels is reduced, the transition between transparent and opaque pixels is sharper.

An additional advantage is that preferred methods and apparatus according to the invention do not require that main image pixels previously stored in a memory to be read from the memory. The embodiments thus save considerable memory bandwidth and conserve power over other possible methods for solving the edge artifact problem which would require reading main image pixels from memory, performing calculations using values of overlay and main pixels, and storing new calculated pixel values. Thus, the preferred methods and apparatus are desirable in mobile devices that rely primarily on a battery for power.

The terms and expressions that have been employed in the foregoing specification are used as terms of description and not of limitation, and are not intended to exclude equivalents of the features shown and described or portions of them. The scope of the invention is defined and limited only by the claims that follow.

We claim:

1. A method, comprising:

using a display controller to perform the following:

determining, for a pixel in a first image, that the pixel is:

an opaque pixel when the luma value of the pixel is within an opaque range that is greater than or equal to a minimum value and less than a first predetermined value, a transparent pixel when the luma value of the pixel is within a transparent range that is less than or equal to a maximum value and greater than a second predetermined value, an intermediate pixel when the luma value of the pixel is within an intermediate range that is greater than the first predetermined value and less than the second predetermined value, wherein the first image is one of an overlay image and a main image, each pixel of the main and overlay images being defined by a luma component and at least one color component, and each luma component taking a value within a luma range, the lowest and highest values in the luma range being, respectively, the minimum value and the maximum value; and replacing each pixel of a second image that is in a location that corresponds to the location of an opaque pixel in the first image with the corresponding opaque pixel of the first image, wherein the second image is the other of the overlay image and a main image; and further including replacing the luma component of each pixel of the second image that is in a location that corresponds to the location of an intermediate pixel with a luma value that is equivalent to the two's complement of the luma value of the corresponding intermediate pixel.

2. The method of claim 1, further including retaining each pixel of the second image that is in a location that corresponds to the location of a transparent pixel.

3. The method of claim 1, wherein the pixels of the first and second images are defined in the YCrCb color space.

4. The method of claim 3, wherein the pixels of the first and second images are in the 4:2:0 sampling format.

5. The method of claim 3, wherein the transparent, opaque, and intermediate ranges are, respectively, 228 to 235, 16 to 23, and 24 to 227.

6. The method of claim 1, wherein the pixels of the first and second images are defined in the YUV color space.

7. The method of claim 6, wherein the pixels of the first and second images are in the 4:2:0 sampling format.

8. The method of claim 7, wherein the transparent, opaque, and intermediate ranges are, respectively, 248 to 255, 0 to 7, and 8 to 247.

9. An apparatus, comprising:

a memory to store image data; and a unit including:

a comparing device that determines, for each pixel in a first image, the first image being one of an overlay image and a main image, the images being defined by a plurality of pixels, each pixel being defined by at least a luma component and a color component, that the pixel is:

an opaque pixel when the luma value of the pixel is within an opaque range that is greater than or equal to a minimum value and lower than a first predetermined value;

a transparent pixel when the luma value of the pixel is within a transparent range that is less than or equal to a maximum value and greater than a second predetermined value;

an intermediate pixel when the luma value of the pixel is within an intermediate range that is greater than the first predetermined value and less than the second predetermined value; and a writing device that replaces a pixel of the first image that is in a location that corresponds to the location of an opaque pixel in the second image with the corresponding opaque pixel of the second image, wherein the second image is the other of the overlay image and a main image; and wherein the writing device replaces the luma component of the pixel of the main image that is in a location that corresponds to the location of an intermediate pixel of the overlay image with a luma value that is equivalent to the two's complement of the luma value of the corresponding intermediate pixel of the overlay image.

10. The apparatus of claim 9, wherein the first image is the main image and the second image is the overlay image.

11. The apparatus of claim 10, wherein the writing device does not replace the pixel of the main image that is in a location that corresponds to the location of a transparent pixel of the overlay image.

12. The apparatus of claim 9, wherein the first image is the overlay image and the second image is the main image.

13. The apparatus of claim 9, wherein the pixels of the main and overlay images are defined in the YCrCb color space and the pixels of the images are in the 4:2:0 sampling format.

14. The apparatus of claim 13, wherein the transparent, opaque, and intermediate ranges are, respectively, 228 to 235, 16 to 23, and 24 to 227.

15. A system, comprising:

a display device;

at least one image data source;

a memory to store image data; and a unit including:

a comparing device that determines, for a pixel in one of an overlay image and a main image, the images being defined by a plurality of pixels, each pixel being defined by at least a luma component and a color component, that the pixel is:

an opaque pixel when the luma value of the pixel is within an opaque range that is greater than or equal to a minimum value and lower than a first predetermined value;

a transparent pixel when the luma value of the pixel is within a transparent range that is less than or equal to a maximum value and greater than a second predetermined value;

an intermediate pixel when the luma value of the pixel is within an intermediate range that is greater than the first predetermined value and less than the second predetermined value; and a writing device that replaces a pixel of a first image that is in a location that corresponds to the location of an opaque pixel in a second image with the corresponding opaque pixel of the second image, wherein the second image is the other of the overlay image and a main image; and wherein the writing device replaces the luma component of the pixel of the main image that is in a location that corresponds to the location of an intermediate pixel of the overlay image with a luma value that is equivalent to the one's complement of the luma value of the corresponding intermediate pixel of the overlay image.

16. The system of claim 15, wherein the writing device does not replace the pixel of the main image that is in a location that corresponds to the location of a transparent pixel of the overlay image.

17. The system of claim 15, wherein the transparent, opaque, and intermediate ranges are, respectively, 248 to 255, 0 to 7, and 8 to 247.

* * * * *